United States Patent Office 3,293,251
Patented Dec. 20, 1966

3,293,251
REARRANGEMENT PROCESS FOR 3,8-DIAZA-BICYCLO-(3,2,1)-OCTANE DERIVATIVES
Giorgio Cignarella, Milan, Italy, and Emilio Testa, Vacallo, Tessin, Switzerland, assignors to Lepetit S.p.A., Milan, Italy
No Drawing. Filed May 31, 1963, Ser. No. 284,340
Claims priority, application Great Britain, June 15, 1962, 23,157/62
3 Claims. (Cl. 260—268)

This invention is concerned with a new process for preparing 3,8-diazabicyclo-[3,2,1]-octanes having the general formula

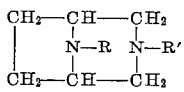

wherein one of the symbols R and R' represents an acyl radical and the other represents hydrogen or an alkyl, aryl, aralkyl, an optionally ring-substituted aralkenyl or cycloalkyl-lower-alkyl radical.

This class of compounds is described and claimed in our copending application Serial No. 202,994, filed June 18, 1962. In said application, the compounds are prepared by reducing 3,8-diazabicyclo-[3,2,1]-octane-2,4-dione or its derivatives in which the nitrogen at position 3 or 8 is substituted with an alkyl, aryl, aralkyl, optionally ring-substituted aralkenyl or cycloalkyl-lower-alkyl radical. The obtained intermediate 3,8-diazabicyclo-[3,2,1]-octane or its $N_3$- or $N_8$-substituted derivative is then acylated according to usual procedures.

We have now discovered that a convenient starting material for the preparation of the above class of substances is 3-benzyl-3,8-diazabicyclo-[3,2,1]-octane, which can be prepared as described in our copending applications Serial Nos. 86,854, filed February 3, 1961, now abandoned, and 104,016, filed April 19, 1961, now patent No. 3,221,015. The novel route runs through the following steps:

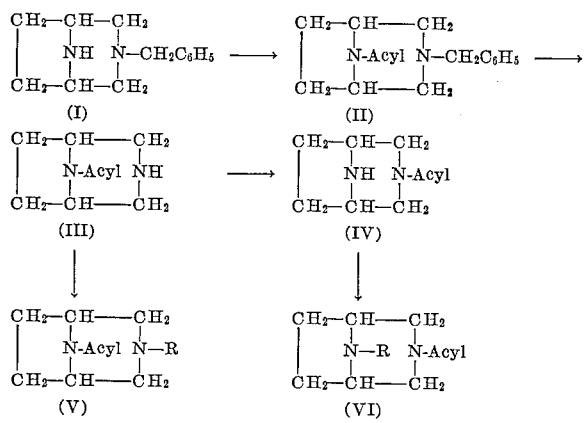

According to the above scheme, in which R represents an alkyl, aryl, aralkyl, optionally ring-substituted aralkenyl or a cycloalkyl-lower-alkyl radical, 3-benzyl-3,8-diazabicyclo-[3,2,1]-octane is converted into the $N_8$-acyl-derivative by acylation through conventional routes giving compound II. This, in turn, by hydrogenation in the presence of palladium on charcoal gives the $N_8$-acylderivative III. The thus obtained 8-acyl-3,8-diazabicyclo-[3,2,1]-octane is then optionally subjected to one of the following treatments: (a) reaction with a compound of the formula XR, in which X represent a halogen atom and R has the above indicated significance, to give the $N_3$-substituted $N_8$-acylderivatives; (b) rearrangement of the acyl group, which migrates to $N_3$ under the action of heat at a temperature of 60° to 140° C. over a period of 5 to 8 hours, or by treatment at room temperature with a solution of an alkali hydroxide in a water-lower alkanol, or by refluxing with a hydrogen chloride solution in a lower alkanol. The obtained $N_3$-acyl-3,8-diazabicyclo-[3,2,1]-octane is then reacted with a compound of the formula XR having the same significance as sub (a), giving the $N_8$-substituted $N_3$-acylderivatives.

The following non-limitative examples illustrate the invention.

EXAMPLE 1

*8-propionyl-3,8-diazabicyclo-[3,2,1]-octane*

A mixture of 12.8 g. of propionic anhydride and 6.7 g. of 3-benzyl-3,8-diazabicyclo-[3,2,1]-octane is heated for 1.5 hours at 100° C. After cooling, hydrochloric acid is added to acidic reaction and the unreacted propionic anhydride is extracted with ethyl ether. The aqueous layer is cooled to −5° C. and made alkaline by the addition of sodium hydroxide solution. The separated oil is extracted with ethyl ether and the solvent evaporated to dryness. The residual oil is distilled collecting 7.4 g. (86.5%) of 3-benzyl-8-propionyl-3,8-diazabicyclo-[3,2,1]-octane, which distils at 170–174° C./1 mm. Hg.

A solution of the above compound in 60 ml. of absolute ethanol is hydrogenated in the presence of 3 g. of 10% palladium on charcoal at 60° C. under 50 atm. of initial hydrogen pressure. After having filtered off the catalyst the solvent is removed in vacuo and the residue distilled to give 4.3 g. (89%) of 8-propionyl-3,8-diazabicyclo-[3,2,1]-octane, B.P. 120–121° C./0.1 mm. Hg.

EXAMPLE 2

*3-cinnamyl-8-propionyl-3,8-diazabicyclo-[3,2,1]-octane*

To a stirred mixture of 0.05 ml. 8-propionyl-3,8-diazabicyclo-[3,2,1]-octane, 0.06 mole of $K_2CO_3$ and 100 ml. acetone, 0.06 mole of cinnamyl chloride in 40 ml. of acetone is added and the reaction mixture refluxed for 7 hours. The inorganic salts are filtered off, the solvent evaporated and the residue dissolved in 10% HCl, the solution extracted with ether, the aqueous layer basified with 50% NaOH, extracted with ether and the solvent evaporated to give the desired 3-cinnamyl-8-propionyl-3,8-diazabicyclo-[3,2,1]-octane which is purified by distillation or by crystallisation; B.P. 170° C./0.2 mm. Hg.

EXAMPLES 3–19

The following compounds were prepared according to the method described in Examples 1 and 2.

| 3-Substituent | 8-Substituent | M.P., °C. | B.P. |
|---|---|---|---|
| Benzyl | Propionyl | | 133–37° C./0.4 mm. |
| Isopropyl | do | | 100° C./0.2 mm. |
| Ethyl | do | | 85–90° C./0.4 mm. |
| Butyl | do | | 105° C./0.2 mm. |
| Phenyl | do | 86–88 | |
| p-Nitrocinnamyl | do | 220 | |
| p-Chlorocinnamyl | do | 220–23 | |
| o-Chlorocinnamyl | do | 201–4 | |
| Allyl | do | | 95–98° C./0.2 mm. |
| Phenethyl | do | | 150° C./0.3 mm. |
| Cyclopentylmethyl | do | | 133–38° C./0.3 mm. |
| Cyclopentylethyl | do | | 145° C./0.4 mm. |
| p-Methylcinnamyl | do | 66–68 | 185–90° C./0.3 mm. |
| Phenylpropyl | do | | 175° C./0.47 mm. |
| p-Methoxycinnamyl | do | | 150° C./0.1 mm. |
| Naphthylallyl | do | 160–65 | |
| m-Chlorocinnamyl | do | 203–205 | |

EXAMPLE 20

*8-benzoyl-3,8-diazabicyclo-[3,2,1]-octane*

To a solution of 2.3 g. of 3-benzyl-3,8-diazabicyclo-[3,2,1]-octane in 10 ml. of 2 N sodium hydroxide cooled at −5° C., 1.92 g. of benzoyl chloride are added dropwise, then the mixture is stirred for 3 hours at room temperature, diluted with water and extracted with ethyl ether. The solvent on evaporation gives 2.9 g. of a viscous undistillable oil which is transformed into the hydrochloride by ethanolic hydrochloric acid solution: yield 3 g., M.P. 219–221° C. (ethanol).

The above crude free base is dissolved in 50 ml. of absolute ethanol and hydrogenated for 6 hours in the presence of 0.8 g. of 10% palladium on charcoal, at 60° C. and 60 atm. of initial hydrogen pressure. The catalyst is filtered off, the solvent evaporated and the residue distilled to give 1.5 g. (80%) of 8-benzoyl-3,8-diazabicyclo-[3,2,1]-octane; B.P. 140–142° C. at 0.5 mm. On standing the product solidifies and is crystallised from ethyl ether, M.P. 82–83° C.

EXAMPLES 21–22

The following compounds were prepared according to the procedure described in the preceding examples:

| 3-Substituent | 8-Substituent | M.P. | B.P. |
|---|---|---|---|
| Benzyl | Phenacyl | 78–81° C | |
| Benzyl | Butyryl | 65–66° C | |

EXAMPLE 23

3-propionyl-3,8-diazabicyclo-[3,2,1]-octane (a) *Thermal rearrangement of 8-propionyl-3,8-diazabicyclo-[3,2,1]-octane.*—One gram of 8-propionyl-3,8-diazabicyclo-[3,2,1]-octane is heated at 120° C. for 5 hours. The oily compound (0.9 g.) is distilled to give 0.8 g. of pure 3-propionyl-3,8-diazabicyclo-[3,2,1]-octane; B.P. 128–30° C. (0.2 mm.); M.P. 38–40° C. (sublimated). This compound is shown to be identical by infrared comparison and by mixed melting point with an authentic sample of 3-propionyl-3,8-diazabicyclo-[3,2,1]-octane.

(b) *Base catalysed rearrangement of 8-propionyl-3,8-diazabicyclo-[3,2,1]-octane.*—One gram of 8-propionyl-3,8-diazabicyclo-[3,2,1]-octane is suspended in 5 ml. of 2 N sodium hydroxide, then a small amount of ethanol is added to obtain a clear solution. After four hours at room temperature the solution is concentrated to half volume at 25° C. under reduced pressure and extracted with ethyl ether. The solvent is evaporated and the residue distilled to give 0.75 g. of an oil, B.P. 126–28° C./0.2 mm., which on standing solidifies (M.P. 38–40° C. after sublimation) and the infrared spectrum of which in CCl₄ is identical with that of pure 3-propionyl-3,8-diazabicyclo-[3,2,1]-octane.

(c) *Thermal-acid rearrangement of 8-propionyl-3,8-diazabicyclo-[3,2,1]-octane.*—One gram of 8-propionyl-3,8-diazabicyclo-[3,2,1]-octane is dissolved in 10 ml. of absolute ethanol, the solution saturated with dry HCl and refluxed for 2 hours under an HCl stream. During the reaction 360 mg. of a white crystalline product separates which is identified by mixed melting point and by infrared spectra as 3,8-diazabicyclo-[3,2,1]-octane dihydrochloride. The alcoholic solution is evaporated in vacuo and the viscous residue treated under cooling with an excess of 20% ethanolic ammonia solution. By adding ethyl ether the inorganic salt is precipitated and filtered off; the solvent is evaporated at 25° C. in vacuo. The oily residue (0.65 g.) is distilled (B.P. 125–126° C. at 0.2 mm.) to give 0.58 g. of pure 3-propionyl-3,8-diazabicyclo-[3,2,1]-octane.

EXAMPLE 24

3-propionyl-8-methyl-3,8-diazabicyclo-[3,2,1]-octane

To 0.7 g. of formic acid and 0.84 g. of 3-propionyl-3,8-diazabicyclo-[3,2,1]-octane, 0.79 g. of 38% formaldehyde are added under cooling. The mixture is gently refluxed for 15 hours, cooled, treated with 1 ml. of hydrochloric acid and concentrated in vacuo at 30–40° C. The residue is made alkaline by addition of 30% sodium hydroxide solution and is extracted with ethyl ether. The organic solution is evaporated and the residue distilled in vacuo to give 0.54 g. of 3-propionyl-8-methyl-3,8-diazabicyclo-[3,2,1]-octane boiling at 110–112° C. with a pressure of 1 mm.

EXAMPLE 25

3-propionyl-8-benzyl-3,8-diazabicyclo-[3,2,1]-octane

The compound is prepared from 3-propionyl-3,8-diazabicyclo-[3,2,1]-octane with benzyl chloride by a procedure quite similar to the one described in Example 2 for 3 - cinnamyl-8-propionyl-3,8-diazabicyclo-[3,2,1]-octane; B.P. 155° C./0.2 mm.

EXAMPLE 26

3-benzoyl-3,8-diazabicyclo-[3,2,1]-octane (a) *Thermal rearrangement of 8-benzoyl-3,8-diazabicyclo-[3,2,1]-octane.*—One gram of 8-benzoyl-3,8-diazabicyclo-[3,2,1]-octane (M.P. 82–83°) is heated for 5 hours at 120° C. On cooling the product becomes solid and can be crystallized from ether to give 0.85 g. of 3 - benzoyl - 3,8-diazabicyclo-[3,2,1]-octane, M.P. 122–123° C.

(b) *Base catalysed rearrangement of 8-benzoyl-3,8-diazabicyclo-[3,2,1]-octane.*—One gram of 8-benzoyl-3,8-diazabicyclo-[3,2,1]-octane is dissolved in 2 ml. of ethanol, 5 ml. of 2 N sodium hydroxide is added and the clear solution is allowed to stand for four hours at room temperature. The reaction mixture is concentrated and extracted with benzene. The solvent is evaporated to give 0.72 g. of a solid compound which after crystallization from ethyl ether yields 0.62 g. of 3-benzoyl-3,8-diazabicyclo-[3,2,1]-octane, M.P. 122–123° C.

(c) *Thermal acid rearrangement of 8-benzoyl-3,8-diazabicyclo-[3,2,1]-octane.*—One gram of 8-benzoyl-3,8-diazabicyclo-[3,2,1]-octane is dissolved in absolute ethanol, saturated with dry hydrochloric acid, boiled in an HCl stream and worked up exactly as described in Example 23 to give 3-benzoyl-3,8-diazabicyclo-[3,2,1]-octane; M.P. 122–123° C.

We claim:

1. Process for preparing 3-acyl-3,8-diazabicyclo-[3,2,1]-octanes of the formula

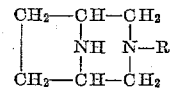

wherein R is selected from the class consisting of propionyl and benzoyl, which comprises subjecting a compound of the formula

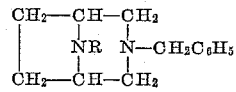

wherein R is as above defined, to the action of hydrogen under pressure in the presence of palladium catalyst to effect replacement of the benzyl group with hydrogen, and then heating the product to cause rearrangement of the aryl group from N₈ to N₃.

2. Process for preparing 3-acyl-3,8-diazabicyclo-[3,2,1]-octanes of the formula

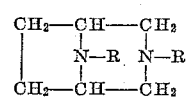

wherein R is selected from the class consisting of propionyl and benzoyl, which comprises heating a 3,8-diazabicyclo-[3,2,1]-octane of the formula

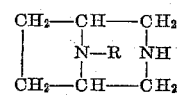

wherein R is as above defined, at a temperature between about 60° and 140° C., until rearrangement is effected.

3. Process according to claim 2, wherein heating of the starting compound is conducted at reflux with hydrochloric acid.

References Cited by the Examiner
UNITED STATES PATENTS

| | | | |
|---|---|---|---|
| 2,415,786 | 2/1947 | Buck et al. | 260—268 |
| 2,861,072 | 11/1958 | Weston et al. | 260—268 |

OTHER REFERENCES

Blackman: The Synthesis of 3,8-Diazabicyclo-(3,2,1)-Octane and Some of Its Nitrogen Substituted Derivatives, a doctoral thesis submitted to Polytechnic Institute of Brooklyn in 1960, pages 1–102, pages 62–63 and 75–76 relied on, made available through Dissertation Abstracts, vol. 21, December 1960.

Blackman et al.: Journal Organic Chemistry, vol. 26, pp. 2750–2755 (1961).

Buck et al.: Journal American Chemical Society, vol. 63, pages 1964–66 (1944).

Buck et al.: Journal American Chemical Society, vol. 66, pages 263–266 (1944).

Weissberger: Techniquer of Organic Chemistry, vol. II (Catalytic ... Reactions) (2nd ed.). Published by Interscience Publishers, Inc., N.Y., page 46 (1956).

ALEX MAZEL, *Primary Examiner.*

NICHOLAS S. RIZZO, *Examiner.*

NORMAN H. STEPNO, JAMES W. ADAMS, JR.,
*Assistant Examiners.*